United States Patent [19]

Ginn et al.

[11] Patent Number: 5,223,155
[45] Date of Patent: Jun. 29, 1993

[54] METHOD FOR FILTERING MINERAL SLURRIES

[75] Inventors: Michael W. Ginn, Wrightsville; Gary L. Cobb, Davisboro; Lawrence E. Broxton, Sandersville; Kelly R. McNeely, Mitchell, all of Ga.

[73] Assignee: ECC International Inc., Atlanta, Ga.

[21] Appl. No.: 824,032

[22] Filed: Jan. 22, 1992

Related U.S. Application Data

[63] Continuation-in-part of Ser. No. 534,455, Jun. 4, 1990, Pat. No. 5,098,583.

[51] Int. Cl.$^5$ .................... B01D 29/68; B01D 29/72; B01D 33/48; B01D 33/54
[52] U.S. Cl. .................... 210/791; 210/785; 210/798; 210/388; 210/393; 210/510.1
[58] Field of Search ............ 210/510.1, 785, 393, 210/798, 412, 408, 406, 808, 384, 767, 791, 797, 388; 134/1

[56] References Cited

U.S. PATENT DOCUMENTS

| | | | |
|---|---|---|---|
| 2,990,958 | 7/1961 | Greene et al. | 209/166 |
| 3,014,836 | 12/1961 | Proctor, Jr. | |
| 3,043,431 | 7/1962 | Dudley | 210/798 |
| 3,056,698 | 10/1962 | Kleesattel | 134/1 |
| 3,138,550 | 6/1964 | Woolery | 209/5 |
| 3,450,257 | 6/1969 | Cundy | 209/5 |
| 3,489,679 | 1/1970 | Davidson | 210/785 |
| 3,586,523 | 6/1971 | Fanselow et al. | |
| 3,627,678 | 12/1971 | Marston et al. | |
| 3,655,049 | 4/1972 | Kracklaver | 210/785 |
| 3,707,230 | 12/1972 | Davidson | 210/785 |
| 3,753,498 | 8/1973 | Gwilliam | |
| 3,753,499 | 8/1973 | Gwilliam | |
| 3,782,554 | 1/1974 | Gwilliam | |
| 3,807,298 | 4/1974 | Luke | 210/225 |
| 3,862,036 | 1/1975 | Simmons | 210/412 |
| 3,870,638 | 3/1975 | Karpacheva | 210/412 |
| 3,974,067 | 8/1976 | Nott | 209/166 |

(List continued on next page.)

FOREIGN PATENT DOCUMENTS

| | | | |
|---|---|---|---|
| 210213 | 6/1984 | Fed. Rep. of Germany | 210/785 |
| 6480 | 9/1988 | PCT Int'l Appl. | 210/490 |
| 7402 | 10/1988 | PCT Int'l Appl. | 210/331 |
| 7887 | 10/1988 | PCT Int'l Appl. | 210/785 |
| 580877 | 11/1977 | U.S.S.R. | 210/40 X |
| 1421374 | 9/1988 | U.S.S.R. | 210/408 |
| 2235882 | 3/1991 | United Kingdom | 210/393 |

OTHER PUBLICATIONS

Industrial Filtration by A. Wright, M. E., "The Modern Library of Chemical Engineering", vol. I, The Chemical Catalog Company, Inc., 1923 pp. 123-136.
Filtration by George D. Dickey, Reinhold Publishing Corporation, 1961, pp. 16-23.

*Primary Examiner*—Thomas M. Lithgow
*Attorney, Agent, or Firm*—Klauber & Jackson

[57] ABSTRACT

An improvement is disclosed which is applicable to the method for filtering an aqueous mineral slurry by flowing the slurry through a ceramic filter plate which is characterized by a porous support layer and an overlying porous filtration layer, the pore sizes in said filtration layer being in the range of from about 1 to 3 μm, and the flow through the filter plate being from the filter layer side toward the base layer, and being effected by establishing a fluid pressure differential across the said filter plate by applying suction to the the porous support layer. The improvement facilitates effective discharge of the filter cake from the plate which accumulates upon the porous filtration layer. According to such improvement the suction is extinguished and the support layer side of the plate is subjected to one ore more positive water pressure pulses to effect a transient reverse flow through the plate. Via the uniform pore structure this generates a uniform back pressure and a lubricating film of water at the interface between the filtration layer and the filter cake. Oscillations or vibrations are applied to the surface of the porous filtration layer to facilitate separation of the filter cake.

14 Claims, 2 Drawing Sheets

U.S. PATENT DOCUMENTS

| | | | |
|---|---|---|---|
| 3,997,447 | 12/1976 | Breton | 210/393 |
| 4,032,442 | 6/1977 | Peterson | 210/393 |
| 4,246,039 | 1/1981 | Mixon, Jr. | |
| 4,443,421 | 4/1984 | Hollifield | 210/785 |
| 4,552,669 | 11/1985 | Sekellick | 210/798 |
| 4,698,156 | 10/1987 | Bumpers | 210/393 |
| 4,863,656 | 9/1989 | Hindstrom | 210/510.1 |
| 4,946,602 | 8/1990 | Ekberg | 210/785 |
| 4,956,088 | 9/1990 | Hindstrom | 210/510.1 |
| 4,957,625 | 9/1990 | Katoh | 210/510.1 |
| 4,981,589 | 1/1991 | Hindstrom | 210/504 |
| 5,011,603 | 4/1991 | Katoh | 210/510.1 |
| 5,039,347 | 8/1991 | Hindstrom | 210/785 |
| 5,053,141 | 10/1991 | Laiho | 210/785 |
| 5,059,331 | 10/1991 | Goyal | 210/785 |
| 5,098,583 | 3/1992 | Cobb | 210/510.1 |

PRIOR ART

FIG. 1

PRIOR ART

FIG. 2

METHOD FOR FILTERING MINERAL SLURRIES

RELATED APPLICATION

This application is a continuation-in-part of our co-pending application Ser. No. 534,455, filed June 4, 1990, (now U.S. Pat. No. 5,098,583) which is assignee of the present applications.

BACKGROUND OF INVENTION

This invention relates generally to methods for filtering fine particles from a liquid carrier and more specifically relates to an improved method for dewatering aqueous slurries of very fine particle size minerals, including industrial minerals such as kaolin clays, calcium carbonates, and the like, as well as slurries of fine particles size coal, metaliferous ores, and the like.

In the course of processing numerous minerals, a step of dewatering by filtration is commonly utilized. Such a requirement may be exemplified by considering the processing of crude industrial minerals such as kaolin clays and ground calcium carbonates, where the crude materials are commonly subjected to a series of steps intended to remove undesired impurities such as discolorants, so as to ultimately provide a refined product which is susceptible to the particular use for which it is intended. In the instance, for example, of kaolines, such beneficiation may in some instances be accomplished by dry processing techniques, as for example by air flotation. More commonly, however, especially where the impurities or contaminants to be removed are in some manner chemically combined or intimately associated with the mineral, wet processes of various types are employed. These include such well-known processes as froth flotation, reductive and oxidative bleaching, and high intensity magnetic separation. This is in addition to wet classification, which can also be regarded as a beneficiation step achieving some of the aforementioned objectives.

Thus, in a typical procedure wherein the initial starting material is a crude sedimentary kaolin clay, including from about 1-2% titania, the said crude may be subjected to a separation process to reduce the titania content to below 0.8% by weight. More generally, the titania will be reduced to the range of from about 0.2 to 0.8. Where a froth flotation process is used for such purposes, the clay may be initially blunged and conditioned by forming an aqueous alkaline dispersion of the clay (pH adjusted to about 7-10 with ammonium hydroxide). The dispersion may include as a deflocculating agent various compounds known to be useful for such purposes, such as sodium silicate. Other useful agents include a water-soluble salt of a polyacrylic acid or polymethacrylic acid preferably having an average molecular weight in the range of from about 500-10,000. Oleic acid or other collector agent is added during the conditioning process. Reference may be had to U.S. Pat. No. 3,974,067 for further details of flotation procedures which may be utilized. Further aspects of flotation treatment of the aforementioned type can be found in numerous places in the prior art, including in Cundy, U.S. Pat. No. 3,450,257, and in U.S. Pat. Nos. 2,990,958 and 3,138,550.

The purpose of the froth flotation in the foregoing sequence is to remove titania; and accordingly other techniques can be utilized in place of or to supplement flotation, including by passing the slurry in relatively dilute form and while the clay is dispersed (typically at about 30% solids) through a high intensity magnetic field, e.g. via a magnetic separator of the type disclosed in Marston, U.S. Pat. No. 3,627,678. Such devices comprises a canister packed with stainless steel wool at which enveloping magnets are capable of providing a high intensity field of 12 kilogauss or higher. Froth flotation may be combined with magnetic separation to achieve additional effects, see for example Nott, U.S. Pat. No. 3,974,067.

A further commonly used method for improving the brightness and whiteness of kaolin clays involves chemical bleaching. In this connection, it is noted that one of the principal sources of discoloring contaminants in the crude clay takes the form of insoluble oxides of iron. Thus, a common bleaching technique for removing the said contaminants, involves forming the clay into an aqueous slurry, acidifying the slurry to a pH of the order of 3.0 to 4.0 and adding a slurry soluble salt of hydrosulfurous acid. The general objective of this operation is to provide the $S_2O_4^=$ ion which acts as a reductive bleaching agent. Such ion functions to reduce the ferric compounds present in the slurry to ferrous form, the latter being readily soluble and therefore removable by subsequent washing, dewatering and filtering operations.

A still further type of beneficiation treatment applicable to kaolin crudes involves high temperature calcination. It is useful here to point out that those skilled in the art of kaolin processing and products draw a relatively sharp distinction between so-called calcined kaolins and kaolins which have not been subjected to calcination and are usually referred to as "hydrous" kaolins. With respect to such terminology, it is noted that the prior art literature, including numerous of the prior art patents relating to the field of kaolin products and processing, often uses the term "hydrous" to refer to a kaolin which has not been subjected to calcination—more specifically, which has not been subjected to temperatures above about 450° C., which temperatures serve to impair the basic crystal structure of kaolin. These so-called "hydrous" clays may have been produced from crude kaolins, which have been subjected to beneficiation as, for example, to froth flotation, to magnetic separation, to mechanical delamination, grinding, or similar comminution, but not to the mentioned heating as would impair the crystal structure.

In an accurate technical sense, the description of these materials as "hydrous" is, however, incorrect. More specifically, there is no molecular water actually present in the kaolinite structure. Thus, although the structure can be (and often is) arbitrarily written in the form $2\ H_2O.Al_2O_2.2SiO_2$, it is now well-known that kaolinite is an aluminum hydroxide silicate of approximate composition $Al_2(OH)_4Si_2O_5$ (which equates to the hydrated formula just cited). Once the kaolin is subjected to calcination, which, for the purposes of this specification means being subjected to heating of 450° C. or higher for a period of which eliminates the hydroxyl groups, the crystalline structure of the kaolinite is destroyed. Therefore, such material, having been thus calcined, cannot correctly be referred to as a "kaolin". Accordingly, it should be appreciated that henceforth in this specification, unless otherwise indicated, when the term "kaolin" or "kaolinite" is utilized without a qualification (such as "calcined kaolin"), such term necessarily implies that the original structure of the material is intact. Thus, the unqualified term "kaolin" as used herein, can be considered to be equivalent to the technically inaccurate (but oft-occurring) prior art usage, "hydrous kaolin" or sometimes simply "hydrous clay".

Detailed discussions of calcined clays and their method of preparation may be found in numerous prior art patents. Particular reference may be made in this connection to U.S. Pat. No. 3,014,836 to Proctor, Jr.; 3,586,523 to Fanselow et al; and to A. D. McConnell et al. U.S. Pat. No. 4,381,948. The procedure set forth for producing a calcined clay is detailed in the said McConnell et al patent and provides a product substantially corresponding to the commercially available product ALPHATEX ® of the present assignee ECC America Inc. In the said procedure, which is exemplary of modern practice in the calcined clay art, the crude kaolin clay is blunged and dispersed to form an aqueous dispersion. The blunged and dispersed aqueous slurry is subjected to a particle size classification from which there is recovered a fine fraction slurry of the clay. Following this, the clay may be dewatered by being flocculated and filtered, redispersed as a slurry and dried; or the classified slurry may be dewatered by directly drying, for example by spray drying.

As is discussed in Fanselow et al and elsewhere, the calcined clay process as same has been outlined, can be supplemented by use of additional beneficiation steps such as those previously discussed, i.e. froth flotation, high intensity magnetic separation, and the like.

It will be evident from the foregoing that whether one is considering the processing of so-called hydrous clays or of calcined clays, at various points in the processing of same, dewatering by filtration is a common and necessary step. The predominant practice in the kaolin industry calls for such filtration to be accomplished by rotary vacuum filters (RVF), although other instrumentalities are also used as will be further discussed. Dewatering of kaolin slurries by use of such apparatus is normally accomplished in an acid (3.0-3.5 pH) flocculated condition. Most commonly, the dewatering process usually follows bleaching, and entails heating to approximately 130° F. and filtering using a rotary vacuum drum filter. Typically this technique produces a 56-62% solids product cake, and is regarded as the industry standard.

Dewatering by use of plate and frame presses, is also accomplished in an acid (3.0-3.5 pH) flocculated low solids (20-30%) condition. This technique produces a 70-72% solids product cake, but is not generally considered cost effective. Automation in recent years has somewhat offset the economic disadvantage of this type of apparatus.

In a series of patents including e.g. U.S. Pat. Nos. 3,753,498, 3,753,499, and 3,782,554, assigned to ECC International Limited of St. Austell, Cornwall, England, tube presses are described, which are also useful when filtering kaolins and similar very fine particle size minerals. Dewatering is again accomplished in an acid (3.0-3.5 pH) flocculated low solids condition. The technique has the advantage of producing a 75% solids product cake, but is unfortunately maintenance and cost intensive.

One of the known exceptions to the inability of prior art filtering techniques to effectively filter very fine particle size minerals such as kaolins having particle size distribution (PSD) such that 50% or more of same by weight are of less than 0.5 $\mu$m, involves use of the so-called electrically augmented vacuum filter ("EAVF⇌"). Reference may be had in this connection to such use in Mixon, Jr., U.S. Pat. No. 4,246,309. Use of an EAVF enables filtering of dispersed (7.0-9.0 pH) 38-40% solids feed slurries; and the said filter is also capable of producing a 75-80% solids product cake. The EAVF technology is such that flocced kaolins cannot be effectively filtered. While it would be thought because of these advantages that the said filtering technique would have come into widespread commercial use, such is decidedly not the case. This is explained by the complexity of the device (which is based upon the principle of providing an electric field which appropriately interacts with a membrane), and the attendant high costs of maintaining and operating such device. Simply stated, the devices have not proved reliable or economically feasible for widespread application.

A further technique which has found application to dewatering of clays, is simple thermal evaporation. According to this technology, 60% solids filtered product can be thermally evaporated until the slurry reaches 70% solids. This technology is of specialized interest in application, but cannot meet the variety of needs and conditions for use required in industry such as the kaolin processing industry.

A still further technique for dewatering involves the use of centrifuges. These systems can be very effective for dewatering especially with feeds in the 20-30% range, and products up to the 50% range. When these limits are reached, the slurry viscosity and mechanical speed constraints, reduce cost effectiveness and performance to unacceptably low levels.

While the foregoing discussion has been especially directed at the unique aspects of beneficiation of kaolins, it may be noted that the requirement for dewatering of a fine particle size mineral slurry arises in many other environments. In recent years for example, precipitated calcium carbonates ("PCC's") have come into increasing use in paper manufacture. Both during production of such PCC's and in the course of handling and shipping same, it is often desired to prepare a high solids aqueous slurry or to increase the solids content of a given slurry. In either event, an effective filtration method is much sought after.

For some years the concept of ceramic filtration has been known as a method for dewatering a range of materials including slurries of particulate minerals, and such filtration techniques are in commercial use at various points in the world for the dewatering and filtering of relatively coarse minerals. Certain recent developments in the field of ceramic filtration have provided ceramic filter constructions which have proved very effective in the filtration of relatively coarse-sized mineral. Reference may especially be had in this connection to international applications WO88/06480, WO88/07402, and WO88/07887. The ceramic filtering elements described in these applications are characterized by an underlying porous support layer, and an overlying porous filtration layer. The ratio of the mean pore size in the support layer to that of the filtration layer is in the range of about 2 to 50. The pore size in the support layer is of the order of 4-50$\mu$m and that of the filtration layer is in the range of from about 0.5 to 3$\mu$m. Particularly in the filtration layer the pores are relatively uniform—i.e., there is a very narrow distribution (within the ranges indicated), so that one may operate at a determined bubble point with assurance that negligible air will pass through the filter during filtration, which may be accomplished at a very high efficiency. Thus in the filtration layer substantially all of the pores are in the 0.5 to 3 μm range. Further details respecting composition and preparation of these ceramic filter materials are set forth in said publications, the entire contents of which are hereby incorporated by reference.

Heretofore, the use of these materials has been limited to relatively coarse particle minerals, having a size range of approximately 1 μm or (in general) much higher. In the case of minerals such as kaolins, it has heretofore proved impractical on any commercial scale to successfully effect filtration of such materials where the average particle size is substantially below about 1 μm, where substantial quantities of the particles are <½ μm, and where the slurry from which said kaolin is to be filtered contains the kaolin is a dispersed or fully dispersed state. This is indeed the reason whey the great bulk of filtration practiced in the kaolin industry, requires the use of flocculation as a precedent step to filtration. Consideration of the prior art and patents and the like will amply demonstrate this point.

Aside from the fact that flocculation introduces a complex and additional step into kaolin processing, it also has the effect of adding further undesired chemical species into the slurry, i.e., the flocculation is usually accomplished by acidification, e.g., with the addition of sulfuric acid or other acid-introducing species, which further complicates the process chemistry due to the need for later neutralization. The result of the latter can be the creation of fluxing agents, unless a great degree of washing is used, which indeed is one of the further consequences of flocculation and conventional filtering. (Fluxing agents are of great concern where the kaolin being processed is intended as a calciner feed.)

In accordance with the teaching of our U.S. Pat. No. 5,098,583 application, an improvement was provided which is applicable to the process for beneficiating a crude kaolin wherein a wet classification step provides a classified kaolin fraction having a PSD such that at least 50% by weight thereof are of less than ½ μm ESD and substantially 100% by weight are of less than 10 μm ESD; and wherein an aqueous slurry of the classified kaolin is at least partially dewatered by filtration. According to our said improvement, at least one or more of the filtration steps are effected by flowing the aqueous kaolin slurry through a ceramic filter plate. The filter plate is characterized by a porous support layer and an overlying porous filtration layer, the ratio between the respective means pore sizes of the filtration layer material and the material of the base layer being between about 2 and 50. The pore size in the filtration layer is in the range of from about 1 to 3 μm and the pore size in the base layer is in the range of from about 4 to 50 μm. The flow through the filter plate is from the direction of the filter layer toward the base layer, and is effected by establishing a fluid pressure differential across the filter plate, preferably by application of vacuum or partial vacuum conditions at the side of the filter plate to which the water is drawn. The kaolin subjected to the filtration may be substantially fully dispersed in the slurry being treated, and the pH of the slurry can be in the range of from about 6.0 to 8.0. The kaolin subjected to the filtration may also be in a flocculated state or in a state of partial dispersion. More generally, the pH of the slurry treated by the invention may therefore reside anywhere in the broad range of from about 2 to 10.

The said U.S. Pat. No. 5,098,583 method may be used to treat a grey kaolin where the classification step has provided a fraction having a PSD such that at least 95% by weight thereof are of less than 1 μm ESD. This fraction can also have been subjected to a high intensity magnetic separation of a dispersed slurry and the output from the magnetic separator may be passed to the ceramic filter without use of any intervening flocculation step. Similarly, an oxidative bleaching step, as for example by use of ozone, may have been used upstream of the magnetic separation of the grey kaolin. The partially dewatered slurry from the ceramic filter can be spray dried to provide a feed for subsequent calcination (oxidative bleaching would not be used when the product was intended for calcination.

More generally, the method of our prior application may be used to treat any coarse or fine grey kaolin. These kaolins cannot normally be beneficiated by oxidative bleaching and also do not flocc well. The invention, however, facilitates beneficiation of these grey kaolins in a process which can include one or more of such steps as blunging, degriting, magnetic separation, ozonation, classification and dewatering.

In the case of the flocculated kaolin, the partially dewatered kaolin in slurry from the ceramic filter can be dispersed and then dewatered at a further ceramic filter to provide a high solid slurry including >70% by weight solids. This high solids slurry may be used directly in that form, or may be spray dried to provide a product. Where the kaolin in the slurry provided to the ceramic filter is at least partially dispersed, it may include about 60% solids, and the slurry can be further dewatered by the ceramic filter, to again provide a slurry having >70% solid.

The method of our prior invention offers several benefits in kaolin processing. Among these are: Kaolin particle size ranging from coarse to ultrafine (10 μm to ¼ μm) can be filtered. Kaolin processing can be effectively performed in a wide range of pH's, i.e., from 2 to 10. Economical dewatering rates and product solids using various feed solids 5–70%, solids with product solids up to 80% can be obtained using this technology. The process operates under broad temperature ranges, and filters flocced, semi-dispersed, and dispersed feeds, so that the resulting filtrate is clear with little or no suspended solids.

Both in the instances of kaolin filtration as taught in our prior Ser. No. 534,455 application, and as well in the instance of other prior disclosed use of ceramic filters of the types discussed herein, serious impediments to practical large scale commercial use of same has been presented as a consequence of the tendency of such filters to become clogged with the fine particles of the slurry being filtered. Directly related to this is the difficulty encountered in removing the filter cakes, that having been formed upon the surface of the filter via a suction process, is found to adhere so tenaciously to such surface, that a scraper or doctor blade or other mechanical attack on the filter cake is conventionally required to effect removal of the cake. See in this connection WO 88/07887. These prior art techniques of cake removal are at best inefficient, of limited efficacy, and are inconsistent and relatively unpredictable in results. They are, furthermore, poorly adopted to an operation predicated on a continuous or semi-continuous operation; i.e. one in which the filter plate is rapidly used for filtration, and then is subjected to cake removal, after which the plate must be fully ready for further recycling in the same process.

In accordance with the foregoing, it may be regarded as an object of the present invention, to provide a method based upon use of ceramic filter plates, which is especially useful in high volume and efficient dewatering of fine particle sized mineral slurries.

A further object of the invention is to provide a method for filtering an aqueous mineral slurry by flowing same through a ceramic filter plate, which enables clean and effective discharge of the filter cake.

It is yet a further object of the invention, to provide a method of the foregoing character, which facilitates rapid and effective cycling of the filter plate through the filter cake forming, cake drying, cake removal, and filter cleaning steps which are involved in cyclic use of such plates.

SUMMARY OF INVENTION

Now in accordance with the present invention, an improvement is provided which is utilizable in the method for filtering an aqueous mineral slurry by flowing the slurry through a ceramic filter plate of the type characterized by a porous support layer and an overlaying porous filtration layer, with flow through the filter plate during filtration being from the filtration layer side toward the base layer and being effected by establishing a fluid pressure differential across the filter plate. According to the improvement, discharge of the filter cake which accumulates upon the plate during filtration, is facilitated by subjecting the support layer side of the plate to one or more positive water pressure pulses, to effect a transient reverse water flow through the plate, thereby generating via the uniform pore structure of the filtration layer a uniform back pressure and a lubricating film of water at the interface between the filtration layer and the filter cake. Controlled oscillations or vibrations are simultaneously or shortly thereupon imparted to the surface of the porous filtration layer to facilitate separation of the filter cake.

Typically the said water pulse(s) will have a pressure in the range of from about 15 to 45 psi and a duration of up to 15 seconds, but preferably from about 2 to 5 seconds. The oscillations or vibrations may be effected from suitably coupled springs or by transducers or the like. The vibrations or oscillations are applied immediately following the water pulse(s) or can be applied simultaneously or at least in part simultaneously. The filter surface during application of the oscillations or vibrations is preferably oriented at an angle of between 0° to 45° with respect to the vertical, and the oscillations are coupled to the plate as to impart vertical oscillations to the latter so that the filter cake as it is dislodged may readily slide from the filter surface to a collecting point or vessel. Following the aforementioned steps, the filter plate may be cleaned by inducing a backwash of water from the support layer side of the plate, while simultaneously applying ultrasonic vibrations to the plate.

While the invention is particularly applicable to the dewatering of aqueous mineral slurries, it is more generally applicable to the separation or filtering of fine particles (less than 325 mesh, or having an equivalent spherical diameter of less than 44 $\mu m$) from a liquid carrier or media for such particles.

DESCRIPTION OF PREFERRED EMBODIMENTS

Figure 1:
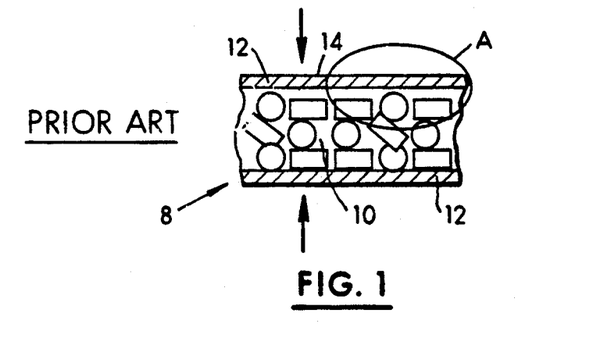
FIG. 1 is a diagrammatic cross section through a portion of a prior art ceramic filter plate of the type utilizable in the present invention.

The ceramic filter plates utilized in the present invention may be of the general type set forth in Internation Patent Application WO88/07402, published Oct. 6, 1988. Details of such filter construction also appear in International Publication No. WO88/06480, published Sept. 7, 1988. To assist in an understanding of the present invention, there is shown in FIG. 1 a schematic depiction of a prior art filter of the type aforementioned, and which may be utilized in the invention. A small cross-section of the filter plate 8 is shown, which is seen to consist of an inner porous support layer 10 which is composed of relatively coarse size particulate or granular material, very typically having a pore size in the range of from about 4 to 50 $\mu m$; which material supports on each side of same a relatively thin filtration layer 12, the pores size in the filtration layer typically being very narrowly defined, i.e., in the present invention such pore size is preferably in the narrow range of from about 0.5 to 3 $\mu m$; i.e. there is a high uniformity of pore size in the said filtration layer 12. Construction of a plate of this type can be as described in U.S. Pat. No. 4,863,656, although it will be clear that different size plates and structures of different dimensions and thicknesses are readily prepared. Very typically a plate of the type shown in FIG. 1 can have a overall thickness of about 1 inch, with the thickness of the filtration layer 12 being very typically 2 to 3 mm. The interior of the plate, i.e. which is defined by the inner support layer 10, may in use be connected to a source of negative pressure or suction via a conduit connecting to the interior of the plate. Again such a detail is shown in U.S. Pat. No. 4,863,656. In use in filtering a slurry of particulate material, such a plate after immersion in the slurry is provided with a negative pressure at the interior, i.e. a gentle suction, which draws the slurry to the surface 14 of the filtration layer, where the particulate material will deposit as the liquid phase is drawn out through the interior via porous support layer 10. This phenomena is shown in greater detail in the enlarged view of FIG. 2, which shows the portion of FIG. 1 within the circle "A".

Pore sizes of less than 0.5 $\mu m$ can be used in the filtration layer 12 and can be advantageous in reducing blinding; however, the filtering flux rate through the filtration layer tends to become unacceptable as the pore size is decreased below about 0.5 $\mu m$. At pore size over about 3 $\mu m$ (assuming operation at 1 atmosphere pressure), an increasing amount of air is pulled through the filtration layer, with a resulting loss in efficiency.

Figure 2:
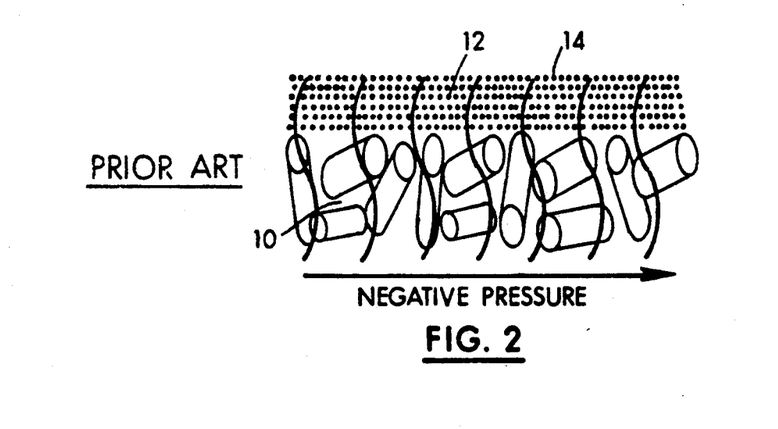
FIG. 2 is an enlarged view of the portion of the FIg. 1 depiction within the circle marked "A"
Figure 3A:
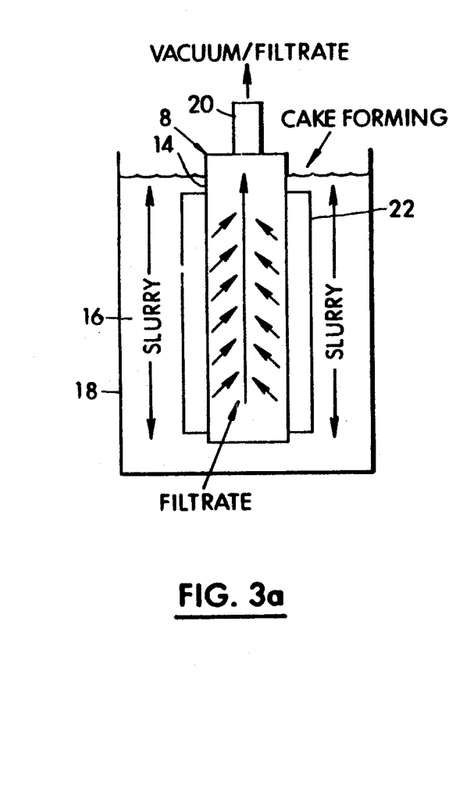
FIGS. 3a-3d are a schematic depiction of the steps which may be utilized in practice of the present invention.
Figure 3B:
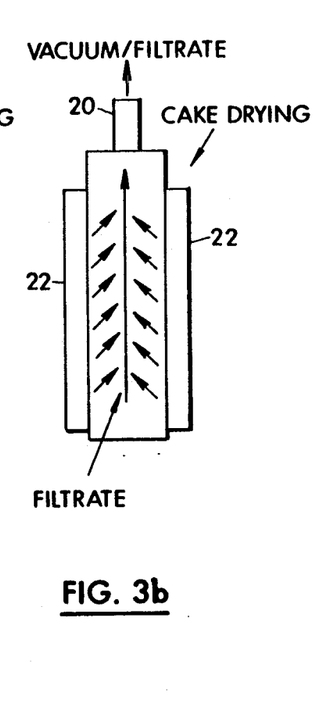
Figure 3C:
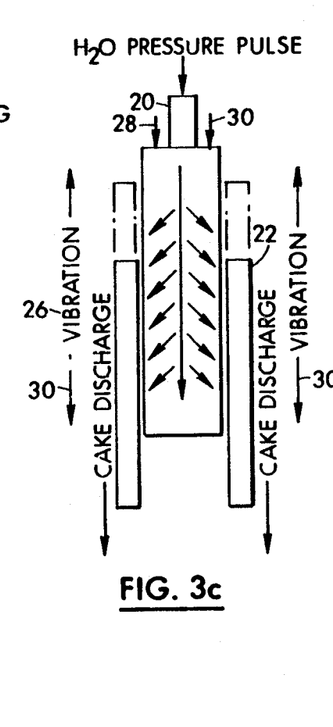
Figure 3D:
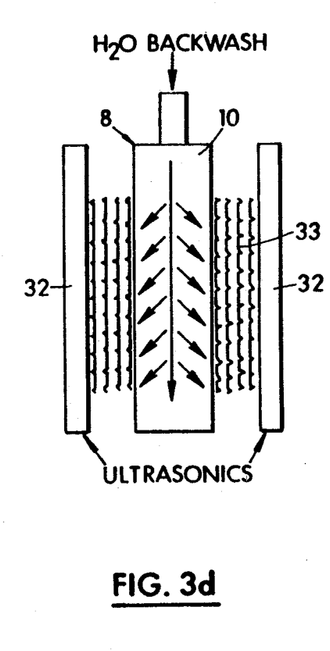

The manner in which the method of the present invention may be carried out is illustrated in FIG. 3 which schematically shows the sequence of steps involved in the present invention. In step (a) of FIG. 3, a ceramic filter plate 8 of the type discussed in connection with FIGS. 1 and 2 is shown as being immersed in a slurry 16 provided within a container 18. Slurry 16 can be a mineral slurry, as for example a kaolin slurry, with the kaolin being in either a dispersed or flocculated state, and typically having a solids content of from about 20 to 75%. The method is equally applicable to numerous other mineral slurries, however, as for example to those based upon dispersions of calcium carbonate pigments, including ground and/or precipitated calcium carbonate pigments. In these instances the carbonate slurries can in some cases be as high as 85 to 90% solids. Also as previously discussed, the method can be used to filter suspensions of other types of fine particles from a liquid carrier.

The step (a) in FIG. 3 is carried out by providing suction or a partial vacuum to the interior of plate 8, the central fluid pressure provided at the duct 20 being approximately 0.9 bars in a typical application. In consequence o such action a clear filtrate is drawn from the conduit 20 which is in communication with the porous support layer 10 at the interior of plate 8, and a filter cake 22 deposits upon the filtration surface 14. Very typically this cake, as for example where kaolin is filtered, can build up to thickness of about 1 to 25 mm. Once an appropriate buildup is achieved, the plate 8 is removed from the tank 18, and as is indicated at step (b) is subjected to further vacuum action to continue to draw further water from the cake 22 to effect an additional degree of drying. Typically the moisture remaining in the cake at the conclusion of step (b) is approximately 20 to 40% where kaolin is the material being operated upon. If desired, an additional step may be inserted between steps (a) and (b) for washing the filter cake. Thus the plate 8 carrying the filter cake can be immersed into a water bath while the vacuum is continued at conduit 20 or water can be applied by spraying or dribbling. Clean water drawn through the filter cake will remove undesired water-soluble salts and the like, after which step (b) is used to remove the excess water.

At step (c) the discharge of the cake 22 is effected. This action is brought about by extinguishing the suction to conduit 20 and providing one or more reverse pulses of water via conduit 20 and therefore to the interior support layer 10. The pressure pulses which are therefore positive with respect to atmosphere should have a preferable level of about 15 to 45 psi and a duration of approximately up to 15 seconds, but preferably for 2 to 5 seconds. Especially by virtue of the very uniform porous structure in filtration surface 12, it is found that the said pressure pulse(s) generate a thin water film 24 at the interface between the filter cakes 22 and the filtering surface 12. These films act essentially as lubricating films. Either wholly or partly simultaneously, or immediately following application of the pressure pulse(s), vertical oscillations or vibrations 26 are applied to the plate 8 and specifically to the filter surface 12 by means of mechanical couplings such as springs or by pneumatically or electromagnetically actuated vibrator heads or the like. Such vibration can for example by brought about by one or more transducers applying vibrational forces such as at 28 and/or 30; which plate 8 is suspended, as will be further discussed herein. Preferably during the pressure pulsing and imparting of oscillations or vibrations, the plate 8, as is suggested in the illustration of step (c), is oriented in a vertical or substantially vertical position, i.e. so that the plane of the filter cakes is substantially vertically oriented. The oscillations or vibrations are applied as to impart oscillatory movements of the plate in a vertical direction; as is suggested by the arrows 30. In a presently preferred arrangement, the plate 10 is suspended from a frame through spring coils. These coils are compressed and then suddenly released when it is desired to impart the oscillatory forces to the plate; i.e. the resultant oscillation of the released springs are directly coupled to the plate which is suspended from the springs.

In consequence of the water pressure pulse(s) and the said oscillatory or vibratory forces, the cake 22 having been dislodged and provided with a lubricating film at its interface with the filter surface 12, is found to not only be dislodged, but to fall virtually as a unit from the surface of the filter to an underlying receiving surface or receptacle, which can for example be a collection bin and/or a conveyor belt or the like, which removes the cake to a point for further processing, or a tank where the cake is repulped into a slurry.

It should be emphasized that the discharge of the cake in this manner is totally at variance with expectations, since one finds in the prior art that scraper blades or the like are required. Indeed it has heretofore been considered that one can remove the cake only with the greatest difficulty, and in fact the cake where so removed is scraped off in somewhat in the manner of a snowplow, i.e. the material is only removed where the scraper comes in contact with same. Unlike the results yielded by the present invention, unitary and complete dislodgement of the filter cake has not heretofore been possible by use of the prior art methods.

The removal by step (c) of the filter cake is so complete, that cleaning requirements are relatively minimal. However, in order to assure the utmost efficiency in the operation of the present devices, the filter plate is preferably subsequently subjected to a cleaning operation as shown at step (d), wherein a backwash of water is provided at conduit 30 via a steady flow of water into the interior support layer 10 of plate 8. It is preferable to simultaneously provide ultrasonic energy 33 incident upon the plate via one or more transducers 32, which assist in dislodging any tenaciously held material at the pores of the filtration surface. This action may be carried out for a period of about 10 minutes, using a back pressure of approximately 15 psi. More generally the backflush (and optional ultrasonic vibrations) can be applied to the plate for a period up to about 2 hours—further application yielding little additional benefit. Typical transducers utilizable for these purposes are available from Branson Ultrasonic Corporation. During the operation shown in step (d), the plate 10 can be suspended in a tank of water, whereby transducers 32 can be positioned at such points in the tank as to couple their sonic energy to the plate via the water medium with which the transducers are in contact.

The following Examples are intended to be illustrative of the method of the present invention and not delimitive of same. In these Examples a series of slurries of several differing kaolin clays and of precipitated calcium carbonates, were subjected to filtration by the method of the invention.

EXAMPLE 1

In this Example a 10 ft$^2$ pilot ceramic disc style filter of the type shown in FIGS. 1, 2 and 3 was utilized to dewater flocculated, fully dispersed and dispersed slurries of the Betacote ® product of ECC International, the assignee of the present application. This product is a fine particle size kaolin coating pigment, having a particle size distribution as shown in Table I below. Utilizing the apparatus shown in FIGS. 1, 2 and 3, the method of the invention was practiced on the three feeds identified pH, slurry temperature and feed solids appear in the Table. In each instance the vacuum (27 inches) was applied to the interior of plate 8 for 40 seconds which resulted in cakes of the indicated thickness and solids content. As at step (b) in FIG. 3, the vacuum was continued for another 40 seconds for drying. Thereupon as in step (c) of FIG. 3, a back pulse of water at 20 psi was applied to the interior of plate 8 for 5 seconds. Up and down vibration was thereupon immediately applied to the filter plate. The cake in each instance fell as a unit to the underlying receptacle. Subsequently, as at (d) in FIG. 3, the plate was cleaned by introducing a constant backflush of water at 20 psi for the cleaning period indicated, during which ultrasound was rendered incident on the plates from transducers mounted at the wall of the cleaning tank. The plates were thoroughly cleaned by this action and ready for recycling. The output of filtered material in tons/hours/1000 ft$_2$ of filter surface is set forth at the bottom of the Table.

TABLE I

| | Betacote | | |
|---|---|---|---|
| | Flocculated | Dispersed | Semi-Dispersed |
| pH | 3.2 | 7.1 | 6.0 |
| Temperature | 40° C. | 40° C. | 40° C. |
| PSD - % by weight less than | | | |
| 10$\mu$ | | 100 | |
| 5$\mu$ | | 97 | |
| 2$\mu$ | | 85 | |
| 1$\mu$ | | 75 | |
| .5$\mu$ | | 59 | |
| .25$\mu$ | | 33 | |
| Feed Solids | 23.8% | 61% | 60.8% |
| Vacuum | 27 in. | 27 in. | 27 in. |
| Form Time | 40 sec. | 40 sec. | 40 sec. |
| Thickness of cake | 8 mm | 1 mm | 3 mm |
| Dry Time | 40 sec. | 40 sec. | 40 sec. |
| Final Cake Solids | 61.5% | 78.1% | 74.7% |
| Back Pulse Pressure | 20 psi | 20 psi | 20 psi |
| Time of Back Pulse | 5 sec. | 5 sec. | 5 sec. |
| Cleaning Time | 3 min. | 10 min. | 5 min. |
| Ton/hr/1000 ft$^2$ | 3.2 | 1.5 | 2.3 |

EXAMPLE 2

The procedure as outlined in Example 1 was repeated utilizing, however, a slurry which comprised flocculated, fully dispersed, and semi-dispersed slurries of the Alphacote ® kaolin clay pigment product of the present assignee. The results of such practice are set forth in Table II.

TABLE II

| | Alphacote | | |
|---|---|---|---|
| | Flocculated | Dispersed | Semi-Dispersed |
| pH | 3.2 | 6.5 | 6.8 |
| Temperature | 40° C. | 40° C. | 40° C. |
| PSD - % by weight less than | | | |
| 10$\mu$ | | 100 | |
| 5$\mu$ | | 99 | |
| 2$\mu$ | | 92 | |
| 1$\mu$ | | 83 | |
| .5$\mu$ | | 69 | |
| .25$\mu$ | | 42 | |
| Feed Solids | 25.2% | 58.2% | 58.5% |
| Vacuum | 27 in. | 27 in. | 27 in. |
| Form Time | 40 sec. | 40 sec. | 40 sec. |
| Thickness of cake | 8 mm | 1 mm | 3 mm |
| Dry Time | 40 sec. | 40 sec. | 40 sec. |
| Final Cake Solids | 58.5% | 75.4% | 73.2% |

TABLE II-continued

| | Alphacote | | |
|---|---|---|---|
| | Flocculated | Dispersed | Semi-Dispersed |
| Back Pulse Pressure | 20 psi | 20 psi | 20 psi |
| Time of Back Pulse | 5 sec. | 5 sec. | 5 sec. |
| Cleaning Time | 3 min. | 10 min. | 5 min. |
| Ton/hr/1000 ft$^2$ | 2.8 | 1.4 | 2.2 |

EXAMPLE 3

The procedure as outlined in Example 1 was repeated utilizing, however, a slurry which comprised flocculated, fully dispersed, and semi-dispersed slurries of the Alphafine ® kaolin clay pigment product of the present assignee. The results of such practice are set forth in Table III.

TABLE III

| | Alphafine | | |
|---|---|---|---|
| | Flocculated | Dispersed | Semi-Dispersed |
| pH | 3.1 | 6.6 | 6.4 |
| Temperature | 40° C. | 40° C. | 40° C. |
| PSD - % by weight less than | | | |
| 10$\mu$ | | 100 | |
| 5$\mu$ | | 99 | |
| 2$\mu$ | | 98 | |
| 1$\mu$ | | 96 | |
| .5$\mu$ | | 88 | |
| .25$\mu$ | | 60 | |
| Feed Solids | 19.9% | 55.6% | 55.5% |
| Vacuum | 27 in. | 27 in. | 27 in. |
| Form Time | 40 sec. | 40 sec. | 40 sec. |
| Thickness of cake | 8 mm | 1 mm | 2 mm |
| Dry Time | 40 sec. | 40 sec. | 40 sec. |
| Final Cake Solids | 57.8% | 73.4% | 70.7% |
| Back Pulse Pressure | 20 psi | 20 psi | 20 psi |
| Time of Back Pulse | 5 sec. | 5 sec. | 5 sec. |
| Cleaning Time | 3 min. | 10 min. | 5 min. |
| Ton/hr/1000 ft$^2$ | 1.9 | 1.2 | 2.1 |

EXAMPLE 4

The procedure as outlined in Example 1 was repeated utilizing, however, a slurry which comprised flocculated, fully dispersed, and semi-dispersed slurries of a precipitated calcium carbonate, having a PSD as indicated in Table IV. The results of such practice are set forth in Table IV.

TABLE IV

| | PCC | | | |
|---|---|---|---|---|
| | Un-dispersed | Dispersed | Sand Ground Semi-Dispersed | Low Solids Un-dispersed |
| pH | 8.3 | 9.7 | 9.2 | 8.25 |
| Temperature | 19° C. | 19° C. | 23° C. | 22° C. |
| PSD | | | | |
| 10$\mu$ | 98 | | | |
| 5$\mu$ | 97 | | | |
| 2$\mu$ | 90 | | | |
| 1$\mu$ | 56 | | | |
| .5$\mu$ | 9 | | | |
| .25$\mu$ | 0 | | | |
| Feed Solids | 29.8% | 29.6% | 47.1% | 18.6% |
| Vacuum | 27 in. | 27 in. | 27 in. | 27 in. |
| Form Time | 40 sec. | 40 sec. | 40 sec. | |
| Thickness of cake | 8 mm | 3 mm | 4 mm | 5 mm |
| Dry Time | 40 sec. | 40 sec. | 40 sec. | 40 sec. |
| Final Cake Solids | 45.6% | 52.0% | 62.5% | 40.0% |

TABLE IV-continued

| | PCC | | Sand Ground Semi-Dispersed | Low Solids Un-dispersed |
| --- | --- | --- | --- | --- |
| | Un-dispersed | Dispersed | | |
| Back Pulse Pressure | 20 psi | 20 psi | 20 psi | 20 psi |
| Time of Back Pulse | 5 sec. | 5 sec. | 5 sec. | 5 sec. |
| Amount of H$_2$O Cleaning Time | | | | |
| Ton/hr/1000 ft$^2$ | 10.9 | 3.0 | 5.8 | 3.4 |

While the present invention has been particularly set forth in terms of specific embodiments thereof, it will be understood in view of the present disclosure, that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. In the method for filtering an aqueous mineral slurry by flowing said slurry through a ceramic filter plate which is characterized by a porous support layer and an overlying porous filtration layer, the pore sizes in said filtration layer being substantially all in the range of from about 0.5 to 3 $\mu$m, and said flow through said filter plate being from said filtration layer side toward said support layer, and being effected by positioning said plate in a container for said slurry and establishing a fluid pressure differential across the said filter plate by applying suction to the said porous support layer thereby forming a filter cake on said filtration layer; THE IMPROVEMENT facilitating effective discharge and collection as product of the filter cake from the said plate which accumulates upon the said porous filtration layer; comprising:

removing said filter plate from said slurry and positioning said plate for cake discharge and collection at a zone underlying said filter plate, the plate surface carrying the cake being oriented at an angle of from about 0° to 45° with respect to the vertical;

extinguishing said suction and subjecting the support layer side of said plate to one or more positive water pressure pulses to effect a transient reverse flow through said plate and via the uniform pore structure generate a uniform back pressure and a lubricating film of water at the interface between said filtration layer and said filter cake; and applying oscillations or vibrations to the surface of said porous filtration layer to facilitate separation of the said filter cake, said separated cake thereby sliding from the plate surface under the influence of gravity and being collected as product at said underlying zone.

2. A method in accordance with claim 1, wherein a said water pulse has a pressure in the range of 15–45 psi.

3. A method in accordance with claim 2, wherein a said water pulse has a duration of from 2 to 5 seconds.

4. A method in accordance with claim 1, wherein said one or more pulses and the said oscillations or vibrations are applied at least in part simultaneously.

5. A method in accordance with claim 1, wherein said one or more water pulses and the said oscillations or vibrations are applied successively.

6. A method in accordance with claim 1, wherein said oscillations or vibrations have substantial vertical components.

7. A method in accordance with claim 1, further including the step of cleaning the filter plate following discharge of the filter cake, by inducing a backwash flow of water from the support layer side of said plate, while simultaneously applying ultrasonic vibrations to the said plate.

8. A method in accordance with claim 1, wherein said support layer defines the hollow interior of said plate, and flow through said support and filtration layer is induced by withdrawing or flowing water to said interior.

9. A method in accordance with claim 1, wherein said mineral is a kaolin clay.

10. A method in accordance with claim 1, wherein said mineral is a calcium carbonate.

11. A method in accordance with claim 1, wherein said mineral is a precipitated calcium carbonate.

12. In the method for filtering an aqueous mineral slurry of fine particles in a liquid carrier by flowing said slurry through a ceramic filter plate which is characterized by a porous support layer and an overlying porous filtration layer, the pore sizes in said filtration layer being substantially all in the range of from about 0.5 to 3 $\mu$m, and said flow through said filter plate being from said filtration layer side toward said support layer, and being effected by positioning said plate in a container for said slurry and establishing a fluid pressure differential across the said filter plate by applying suction to the said porous support layer thereby forming a filter cake on said filtration layer; THE IMPROVEMENT facilitating effective discharge and collection as product of the filter cake from the said plate which accumulates upon the said porous filtration layer; comprising:

removing said filter plate from said slurry and positioning said plate for cake discharge and collection at a underlying said filter plate, the plate surface carrying the cake being oriented at an angle of from about 0° to 45° with respect to the vertical;

extinguishing said suction and subjecting the support layer side of said plate to one or more positive liquid pressure pulses to effect a transient reverse flow through said plate and via the uniform pore structure generate a uniform back pressure and a lubricating film of liquid at the interface between said filtration layer and said filter cake; and applying oscillations or vibrations to the surface of said porous filtration layer to facilitate separation of the said filter cake, said separated cake thereby sliding from the plate surface under the influence of gravity and being collected as product at said underlying zone.

13. A method in accordance with claim 12, wherein said one or more liquid pulses and the said oscillations or vibrations are applied at least in part simultaneously.

14. A method in accordance with claim 12, wherein said one or more water pulses and the said oscillations or vibrations are applied successively.

* * * * *